US011375384B2

(12) United States Patent
Kakishima et al.

(10) Patent No.: US 11,375,384 B2
(45) Date of Patent: Jun. 28, 2022

(54) BEAMFORMING COMMON CHANNELS IN 5G NEW RADIO

(71) Applicant: NTT DOCOMO, INC., Tokyo (JP)

(72) Inventors: Yuichi Kakishima, Tokyo (JP); Satoshi Nagata, Tokyo (JP); Chongning Na, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/075,407

(22) PCT Filed: Feb. 3, 2017

(86) PCT No.: PCT/US2017/016517
§ 371 (c)(1),
(2) Date: Aug. 3, 2018

(87) PCT Pub. No.: WO2017/136732
PCT Pub. Date: Aug. 10, 2017

(65) Prior Publication Data
US 2019/0045377 A1    Feb. 7, 2019

Related U.S. Application Data

(60) Provisional application No. 62/290,812, filed on Feb. 3, 2016.

(51) Int. Cl.
*H04W 16/28* (2009.01)
*H04B 7/06* (2006.01)
(Continued)

(52) U.S. Cl.
CPC ............ *H04W 16/28* (2013.01); *H04B 7/063* (2013.01); *H04B 7/0617* (2013.01);
(Continued)

(58) Field of Classification Search
CPC ...... H04W 16/28; H04W 48/16; H04W 72/02; H04W 72/046; H04W 72/085;
(Continued)

(56) References Cited

U.S. PATENT DOCUMENTS 10,588,137 B2 *   3/2020   Zhang ................. H04B 7/0695
11,245,480 B2 *   2/2022   Zhang ................. H04L 5/0023
(Continued)

FOREIGN PATENT DOCUMENTS

WO    2014/098542 A1    6/2014
WO    2015080646 A1     6/2015
(Continued)

OTHER PUBLICATIONS

International Search Report issued in PCT/US2017/016517 dated Mar. 31, 2017 (4 pages).
(Continued)

*Primary Examiner* — Hoang-Chuong Q Vu
(74) *Attorney, Agent, or Firm* — Osha Bergman Watanabe & Burton LLP

(57) ABSTRACT

A method for wireless communication includes transmitting, with a base station (BS), multiple first signals using respectively different radio resources. The multiple first signals include a common signal component. The radio resource is identified by a radio resource ID. The method further includes receiving, with a user equipment (UE), out of the radio resources the multiple first signals from the BS, selecting, with the UE, a radio resource based on a reception quality of the multiple first signals, transmitting, from the UE to the BS, feedback information including the radio resource ID corresponding to the selected radio resource, and transmitting, from the BS to the UE, a second signal using the radio resource corresponding to the received radio resource ID.

9 Claims, 13 Drawing Sheets

(51) Int. Cl.
*H04W 72/08* (2009.01)
*H04W 72/04* (2009.01)
*H04W 48/16* (2009.01)
*H04W 72/02* (2009.01)
*H04B 7/0456* (2017.01)

(52) U.S. Cl.
CPC .......... *H04B 7/0695* (2013.01); *H04W 48/16* (2013.01); *H04W 72/02* (2013.01); *H04W 72/046* (2013.01); *H04W 72/085* (2013.01); *H04B 7/0456* (2013.01)

(58) Field of Classification Search
CPC .... H04B 7/063; H04B 7/0695; H04B 7/0617; H04B 7/0456
See application file for complete search history.

(56) References Cited

U.S. PATENT DOCUMENTS

| | | | |
|---|---|---|---|
| 2012/0113904 A1* | 5/2012 | Anderson | H04W 76/28 370/329 |
| 2013/0028186 A1* | 1/2013 | Kim | H04B 7/022 370/328 |
| 2013/0064239 A1* | 3/2013 | Yu | H04W 72/046 370/350 |
| 2013/0265946 A1 | 10/2013 | Gao et al. | |
| 2013/0272220 A1 | 10/2013 | Li et al. | |
| 2013/0295852 A1 | 11/2013 | Kim et al. | |
| 2014/0003240 A1 | 1/2014 | Chen et al. | |
| 2014/0105141 A1* | 4/2014 | Noh | H04L 5/0058 370/329 |
| 2014/0169260 A1* | 6/2014 | Nishio | H04J 11/0079 370/312 |
| 2014/0177601 A1* | 6/2014 | Nishio | H04W 72/02 370/332 |
| 2014/0286276 A1* | 9/2014 | Lunttila | H04B 7/024 370/329 |
| 2015/0004969 A1* | 1/2015 | Han | H04L 5/0057 455/434 |
| 2015/0098347 A1* | 4/2015 | Guo | H04L 5/0053 370/252 |
| 2015/0124663 A1* | 5/2015 | Chen | H04L 1/0023 370/278 |
| 2015/0257139 A1 | 9/2015 | Chen et al. | |
| 2015/0282001 A1 | 10/2015 | Kwak et al. | |
| 2015/0372740 A1* | 12/2015 | Ko | H04W 72/0413 370/329 |
| 2016/0157267 A1* | 6/2016 | Frenne | H04W 16/28 370/329 |
| 2016/0183228 A1* | 6/2016 | Song | H04L 5/0023 370/330 |
| 2016/0277225 A1* | 9/2016 | Frenne | H04L 27/261 |
| 2016/0344524 A1* | 11/2016 | Kim | H04B 7/0617 |
| 2016/0373180 A1* | 12/2016 | Guo | H04B 7/0695 |
| 2016/0374055 A1* | 12/2016 | Morita | H04W 72/042 |
| 2017/0094531 A1 | 3/2017 | Kakishima et al. | |
| 2017/0134966 A1* | 5/2017 | He | H04W 4/02 |
| 2017/0188371 A1* | 6/2017 | Kim | H04L 5/0073 |
| 2017/0311301 A1 | 10/2017 | Yu et al. | |
| 2018/0123755 A1* | 5/2018 | Kim | H04L 5/005 |
| 2018/0132125 A1* | 5/2018 | Li | H04W 24/10 |
| 2018/0176065 A1* | 6/2018 | Deng | H04B 7/088 |
| 2018/0242300 A1* | 8/2018 | Hakola | H04B 7/086 |
| 2018/0310283 A1* | 10/2018 | Deenoo | H04W 72/042 |
| 2018/0359790 A1* | 12/2018 | Ingale | H04W 28/16 |
| 2019/0013857 A1* | 1/2019 | Zhang | H04B 7/0617 |
| 2019/0334646 A1* | 10/2019 | Han | H04L 5/0094 |

FOREIGN PATENT DOCUMENTS

| | | |
|---|---|---|
| WO | 2015080649 A1 | 6/2015 |
| WO | 2015/115376 A1 | 8/2015 |
| WO | 2015/133812 A1 | 9/2015 |
| WO | 2015/141065 A1 | 9/2015 |

OTHER PUBLICATIONS

Written Opinion of the International Searching Authority issued in PCT/US2017/016517 dated Mar. 31, 2017 (8 pages).
Jeong, C. et al.; "Randon Access in Millimeter-Wave Beamforming Cellular Networks: Issues and Approaches"; Millimeter-Wave Communications for 5G, vol. 53, No. 1, Jan. 1, 2015, pp. 180-185 (6 pages).
NTT DOCOMO; "Multi-Antenna Technology for NR Interface"; 3GPP TSG RAN WG1 Meeting #85, R1-165179; Nanjing, China; May 23-27, 2016 (5 pages).
Ericsson; "Scenarios and Requirements for the IMT-2020 Evaluations"; 3GPP TSG-RAN ad hoc on Next Generation Access, RPa160024; Barcelona, Spain; Jan. 28-29, 2016 (8 pages).
3GPP TS 36.211 V 13.0.0, "3rd Generation Partnership Project; Technical Specification Group Radio Access Network; Evolved Universal Terrestrial Radio Access (E-UTRA); Physical channels and modulation (Release 13)," Dec. 2015 (141 pages).
Office Action issued in Japanese Application No. 2018-540827; dated Jun. 20, 2019 (6 pages).
Notice of Reasons for Refusal issued in Japanese Application No. 2018-540827, dated Nov. 26, 2019 (4 pages).
Office Action issued in Chinese Application No. 201780019374.X, dated Jul. 31, 2020 (13 pages).
3GPP TSG RAN Meeting #70; RP-151887; "New Work Item on Massive Beamforming for Scell Coverage;" Huawei, HiSilicon; Dec. 7-10, 2015; Sitges, Spain (8 pages).
Office Action issued in European Application No. 17705541.5, dated Jun. 9, 2020 (10 pages).
Jeong et al.; "Random Access in Millimeter-Wave Beamforming Cellular Networks; Issues and Approaches;" Samsung Electronics Co., Ltd.; Jan. 2015 (8 pages).
Office Action in counterpart European Patent Application No. 17 705 541.5 dated Feb. 24, 2021 (12 pages).
Office Action issued in Chinese Application No. 201780019374.X, dated Mar. 11, 2021 (13 pages).

* cited by examiner

BEAMFORMING COMMON CHANNELS IN 5G NEW RADIO

TECHNICAL FIELD

The present invention relates generally to radio communications and, more particularly, to beamforming for coverage enhancement in a radio communication system.

BACKGROUND ART

Utilization of higher frequency bands (e.g., above 6 GHz) in a New Radio (NR) (fifth generation (5G)) technology is being studied in Third Generation Partnership Project (3GPP). Higher frequency bands have coverage limitations because of higher pass loss. Therefore, it is important to ensure coverage in a 5G system using higher frequency bands.

On the other hand, in Long Term Evolution (LTE) legacy standards such as LTE Release 13, beamforming is not applicable for cell-common signals and channels (e.g., Primary Synchronization Signal (PSS)/Secondary synchronization signal (SSS), Physical Downlink Control Channel (PDCCH), Cell-specific Reference Signal (CRS) and Physical Broadcast Channel (PBCH)) so that the cell-common signals and channels are transmitted to all user equipments (UEs) in a cell within coverage of a base station (BS). As shown in FIG. 1, according to a radio communication system under LTE legacy standards such as LTE Release 13, for example, the BS transmits the cell-common signal(s) and channel(s) that are not beamformed to the cell within the coverage of the BS. All the UEs in the cell receive the cell-common signal(s) from the BS.

If the cell-common signals and channels that are not beamformed are transmitted in higher frequency bands, coverage for transmitting the cell-common signals and channels may be decreased compared to transmission in lower frequency bands. Furthermore, a transmission scheme of the beamformed cell-common signals are not determined in the 3GPP standards. Therefore, under the conventional technology, the beamformed cell-common signals is not able to be transmitted properly.

CITATION LIST

Non-Patent Reference

[Non-Patent Reference 1] 3GPP, TS 36.211 V 13.0.0

SUMMARY OF THE INVENTION

According to one or more embodiments of the present invention, a method for radio communication may comprise transmitting, with a base station (BS), multiple first signals using respectively different radio resources. The multiple first signals may comprise a common signal component.

A method for radio communication according to embodiments of the present invention can ensure coverage for a radio communication system using a higher frequency.

DETAILED DESCRIPTION OF EMBODIMENTS

Embodiments of the present invention will be described in detail below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
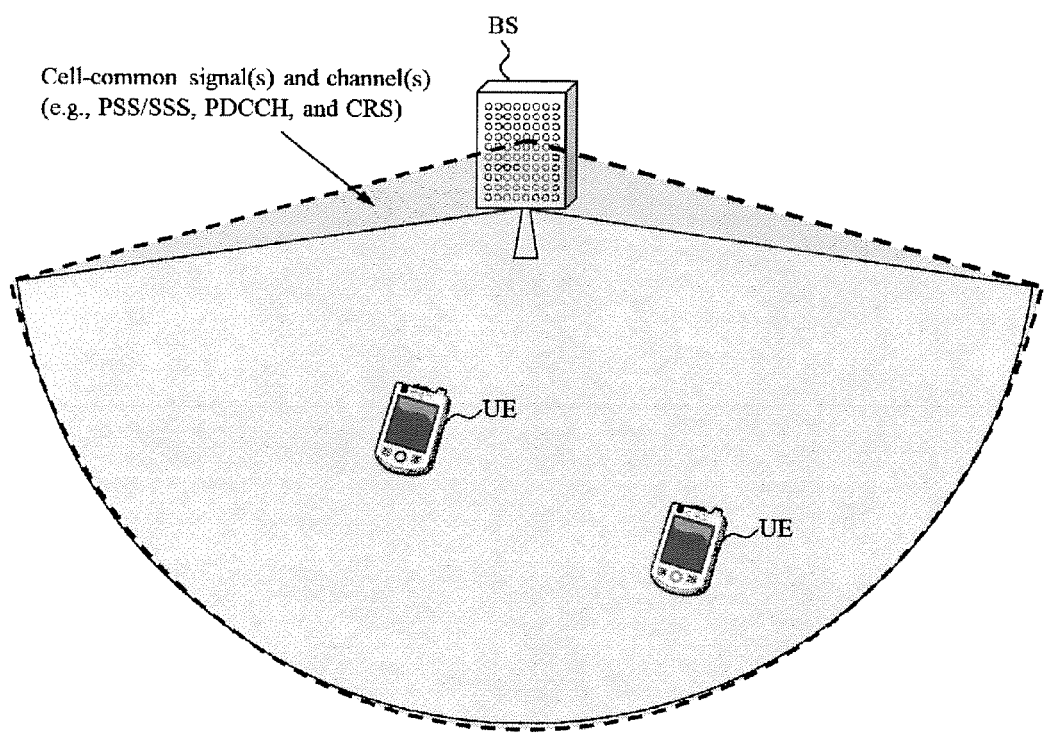
FIG. 1 is a diagram showing a radio communication system that does not apply beamforming to cell-common signals and channels according to LTE legacy standards.
Figure 2:
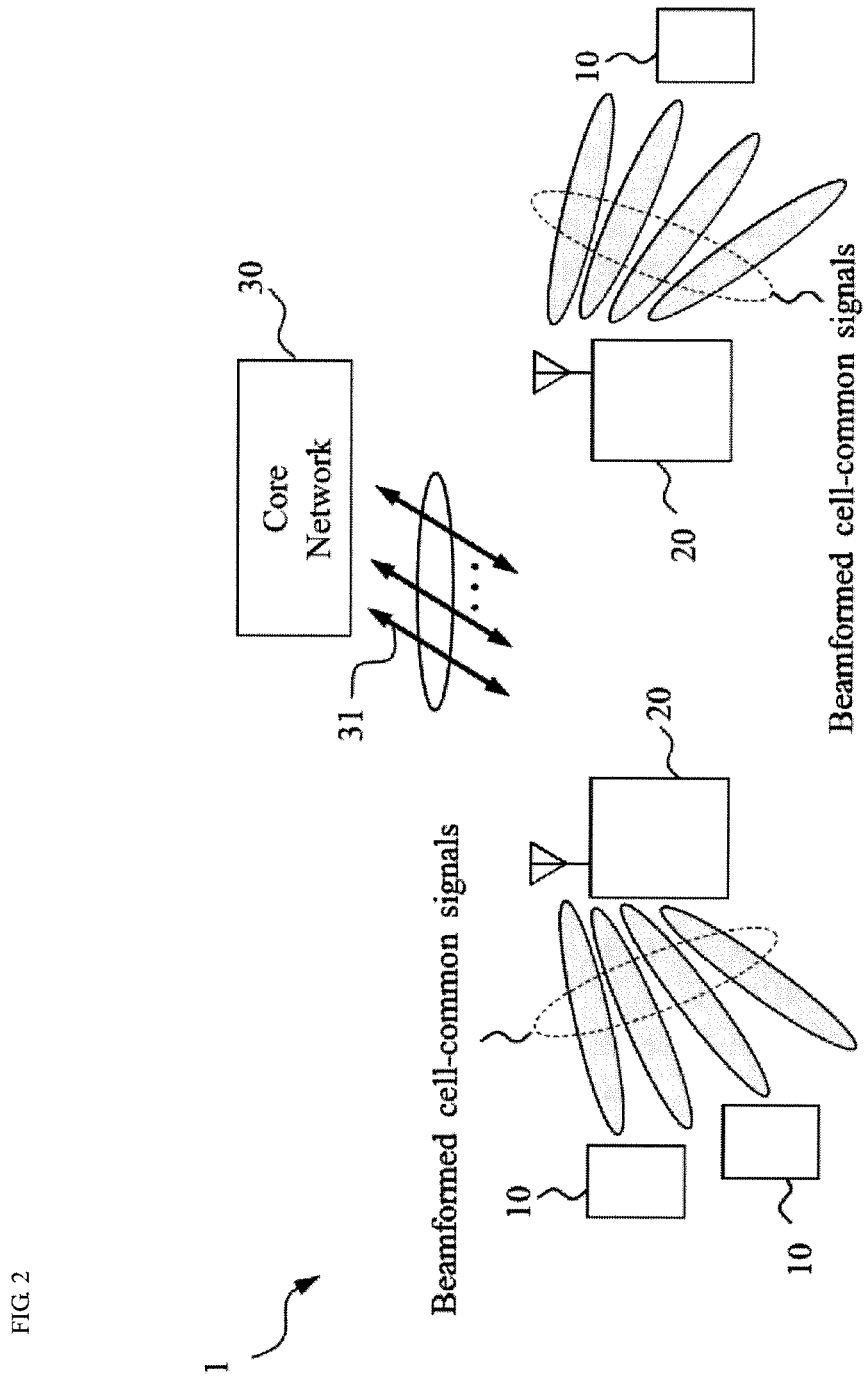
FIG. 2 is a diagram showing a configuration of a radio communication system according to one or more embodiments of the present invention.

FIG. 2 illustrates a radio communications system 1 according to one or more embodiments of the present invention. The radio communication system 1 includes User Equipments (UEs) 10, Base Stations (BSs) 20, and a core network 30. The radio communication system 1 may be an LTE/LTE-Advanced (LTE-A) system or a New Radio (NR) system supporting a scheme to transmit multiple signals using beams (radio resources) such as a beamforming mechanism. The radio communication system 1 is not limited to the specific configurations described herein and may be any type of radio communication system supporting the beamforming mechanism. In one or more embodiments of the present invention, a "beam" may be an example of a "radio resource."

The BS 20 may communicate uplink (UL) and downlink (DL) signals with the UE(s) 10 in coverage via multiple antenna ports using MIMO technology. The DL and UL signals include control information and user data. The BS 20 may communicate DL and UL signals with the core network 30 through backhaul links 31. The BS 20 may be Evolved NodeB (eNB) or a base station in the NR system.

The BS 20 includes an antenna for MIMO, a communication interface to communicate with an adjacent BS 20 (for example, X2 interface), a communication interface to communicate with the core network 30 (for example, S1 interface), and a CPU (Central Processing Unit) such as a processor or a circuit to process transmitted and received signals with the UE 10. Operations of the BS 20 described below may be implemented by the processor processing or executing data and programs stored in a memory. However, the BS 20 is not limited to the hardware configuration set forth above and may be realized by other appropriate hardware configurations as understood by those of ordinary skill in the art. Numerous BSs 20 may be disposed so as to cover a broader service area of the radio communication system 1.

The BS 20 may transmit at least a cell-common signal and channel that are beamformed toward different directions in the coverage of the BS 20. The cell-common signal and channel may be a Primary Synchronization Signal (PSS)/Secondary synchronization signal (SSS), a Physical Downlink Control Channel (PDCCH), a Physical Broadcast Channel (PBCH), and a Cell-specific Reference Signal (CRS). The PSS/SSS may be also called Synchronization Signal (SS). Generally, under the LTE legacy standards, the cell-common signal and channel (hereinafter, "cell-common signal") are transmitted to all UEs 10 in a cell within coverage of the BS 20 and beamforming is not applicable for the cell-common signal. According to one or more embodiments of the present invention, beamforming may be applicable for the cell-common signal.

For example, the BS 20 according to one or more embodiments of the present invention may transmit not only the beamformed cell-common signal but also the cell-common signal that is not beamformed. The beamforming may be applicable for all or part of the cell-common signals. For example, beamforming may be applicable for the SS and may not be applicable for the PDCCH. The beamforming may be applicable for the cell-common signals transmitted to predetermined directions. For example, a part of the SSs may be beamformed toward the predetermined directions and the other SSs may not be beamformed.

The UE 10 communicates DL and UL signals that include control information and user data with the BS 20 using MIMO technology. The UE 10 may be a mobile station, a smartphone, a cellular phone, a tablet, a mobile router, or information processing apparatus having a radio communication function such as a wearable device.

The UE 10 includes a CPU such as a processor, a RAM (Random Access Memory), a flash memory, and a radio communication device to transmit/receive radio signals to/from the BS 20 and the UE 10. For example, operations of the UE 10 described below may be implemented by the CPU processing or executing data and programs stored in a memory. However, the UE 10 is not limited to the hardware configuration set forth above and may be configured with, e.g., a circuit to achieve the processing described below.

The UE 10 may receive at least a beamformed (BF) cell-common signal from the BS 20. The UE 10 may also receive the cell-common signal that is not beamformed.

Figure 3:
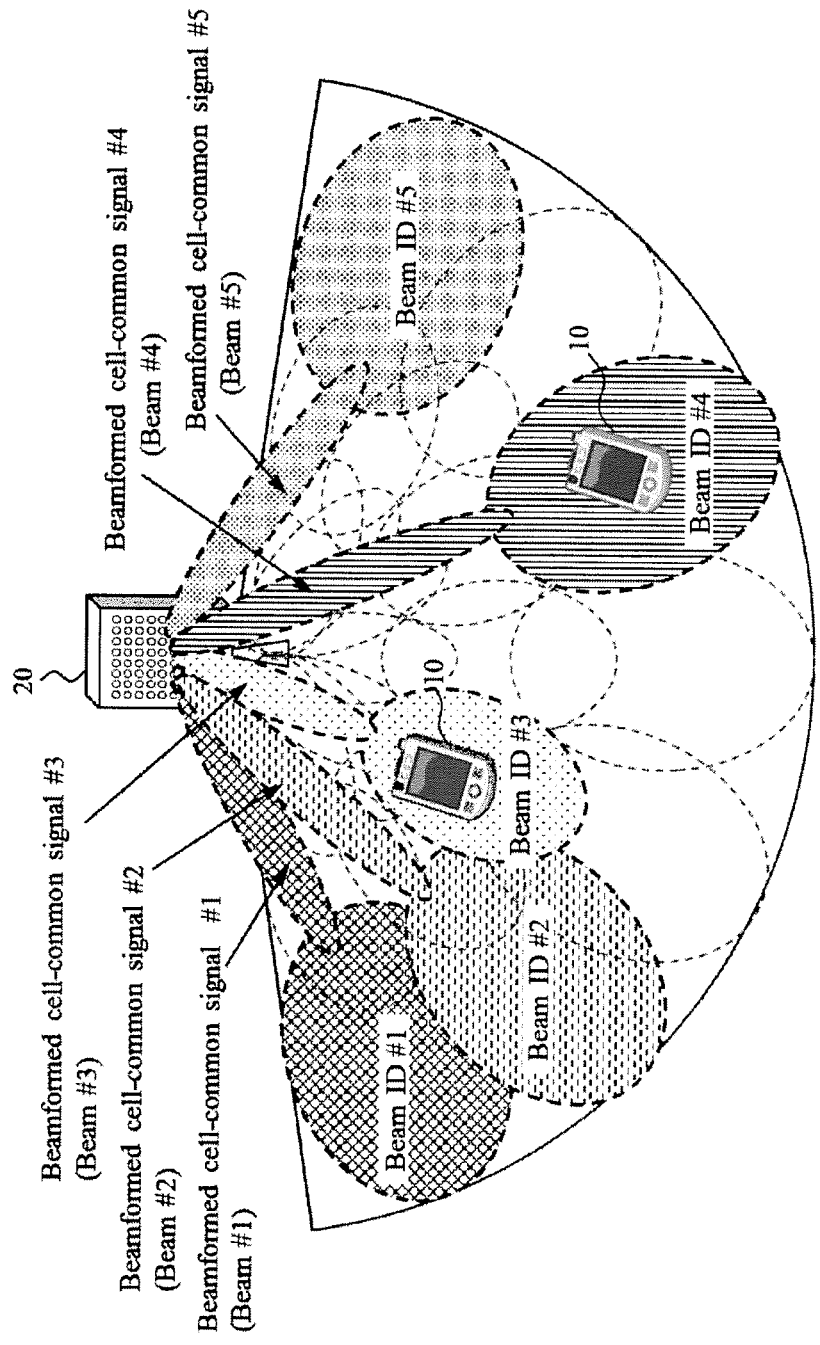
FIG. 3 is a diagram showing the radio communication system that applies beamforming to cell-common signals and channels according to one or more embodiments of the present invention.

FIG. 3 is a diagram showing the radio communication system that applies beamforming to cell-common signals and channels according to one or more embodiments of the present invention. As shown in FIG. 3, the BS 20 may transmit a plurality of BF cell-common signals such as the BF cell-common signals #1 to #5 on beams #1 to #5, respectively. Each of the beams used for beamforming may form a cell associated with a beam ID. For example, the beams #1 to #5 may form the cells associated with the beam IDs #1 to #5, respectively. Furthermore, in one or more embodiments of the present invention, the beam ID may be referred to as a radio resource ID (RRID), a Beam Index (BI), or an Antenna Port (AP).

According to one or more embodiments of the present invention, the BS 20 may transmit a plurality of BF cell-common signals. The UE 10 may generate feedback information to determine a beam used for transmission between the BS 20 and the UE 10 out of beams corresponding to the plurality of BF cell-common signals. The UE 10 may transmit the feedback information to the BS 20. The BS 20 may transmit a data signal using the beam determined based on the feedback information to the UE 10.

(Process for Beam Determination (Selection))

First Example

According to one or more embodiments of a first example of the present invention, the BS 20 may transmit multiple Synchronization Signals (SSs) (first signals) using respectively different beams (radio resources). The multiple SSs may comprise a common signal component (e.g., signal sequence). The UE 10 may receive all or part of the multiple SSs from the BS 20 and select a beam from the beams based on a reception quality of the multiple SSs. Then, the UE 10 may transmit feedback information including information indicating the selected beam to the BS 20.

Figure 4:
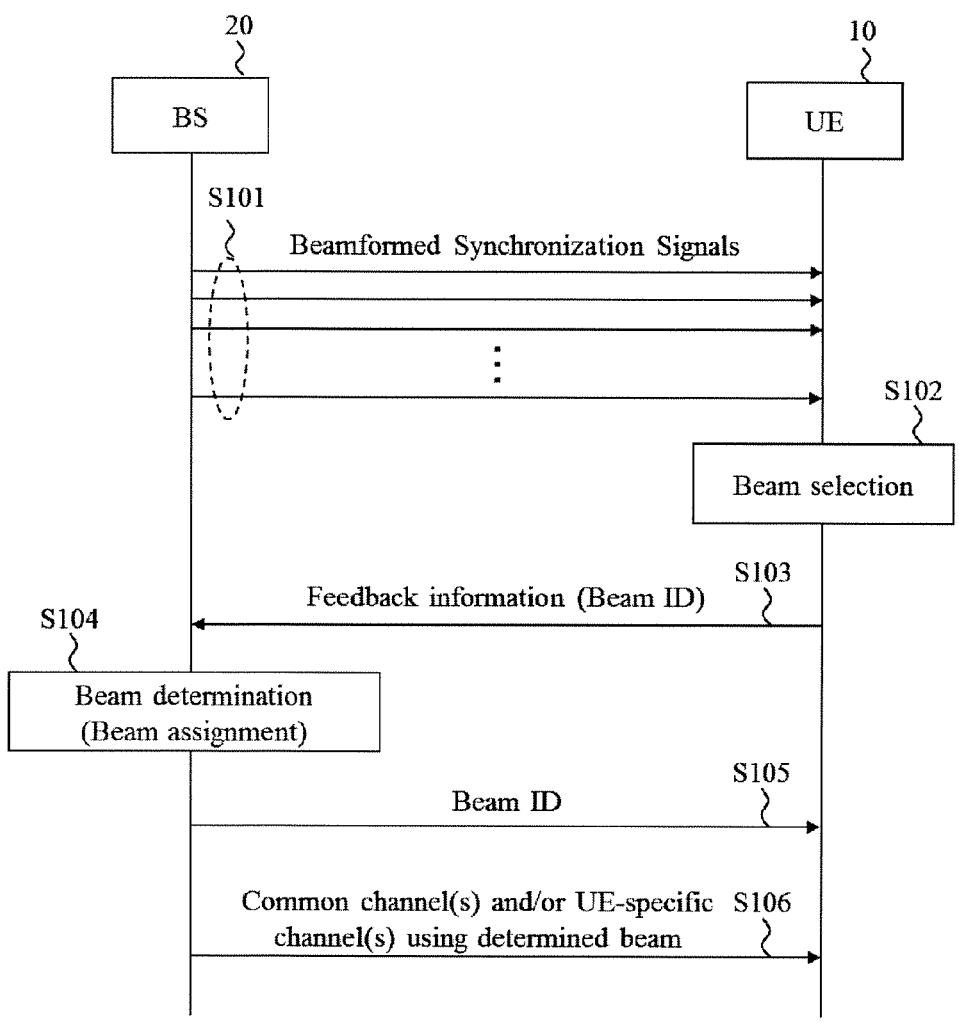
FIG. 4 is a sequence diagram showing a beam determination (selection) scheme according to one or more embodiments of a first example of the present invention.

FIG. 4 is a sequence diagram showing a beam determination (selection) scheme according to one or more embodiments of the first example of the present invention. As shown in FIG. 4, the BS 20 may transmit a plurality of BF SSs (first signal) using respectively different beams within the coverage of the BS 20 (step S101). The SSs may comprise a common signal component such as a signal sequence. Each of the beams may be identified by a beam ID (each of the radio resources may be identified by a radio resource ID). For example, each of the BF SSs includes the beam ID associated with the beam used for transmission of the BF SS.

The UE 10 may receive a plurality of BF SSs transmitted from the BS 20. The UE 10 may obtain the beam IDs based on the received BF SSs. Then, the UE 10 may select a beam out of a plurality of beams used for transmission of the plurality of BF SSs based on the reception quality of the BF SSs (step S102). The reception quality may be a Signal to Interference-plus-Noise Ratio (SINR), a Reference Signal Received Power (RSRP), Received Signal Strength Indicator (RSSI), or a Reference Signal Received Quality (RSRQ) or other information that reflects channel quality. For example, the UE 10 may select the beam ID associated with the beam of which the reception quality is the highest out of a plurality of beams. For example, the UE 10 may obtain the beam ID during an initial connection procedure, e.g., received SS and random access procedure. For example, the UE 10 may obtain the beam ID based on the CRS, a Radio Resource Control (RRC) signaling, a Master Information Block (MIB), or a System Information Block (SIB), or a newly defined signal (e.g., Measurement RS/Mobility RS (MRS)).

Then, the UE 10 may transmit feedback information including the selected beam ID as feedback information to the BS 20 (step S103).

The BS 20 may determine the beam for transmission to the UE 10 based on the beam ID selected by the UE 10 (step S104). In other words, the BS 20 may assign the beam ID to the beam for transmission to the UE 10.

Then, the BS 20 may notify the UE of the beam ID corresponding to the beam for transmission to the UE 10 (step S105).

The BS 20 may transmit, to the UE 10, common channel(s) and/or UE-specific channel(s) (second signal) using the determined beam (step S106). For example, at the step S106, the beam ID may be associated with a signal sequence and a multiplexing position of the first signal and the second signal.

Thus, according to one or more embodiments of the first example of the present invention, it may be possible to ensure coverage for the radio communication system 1 using the higher frequency.

According to one or more embodiments of a first modified example of the present invention, a signal sequence and a multiplexing position of a Cell-specific and/or UE-specific signal(s) may be associated with the beam ID. The UE 10 may determine, based on the beam ID, the signal sequence and the multiplexing position of a Cell-specific and/or UE-specific signal(s) such as the MRS, a Channel State Information Reference Signal (CSI-RS), a Sounding Reference Signal (SRS), and an Uplink/Downlink Demodulation Reference Signal (DMRS).

According to one or more embodiments of a first modified example of the present invention, the beam selection (determination) in the UE 10 may apply a mechanism of Layer 3 (L3) filtering and time to trigger such as Radio Resource Management (RRM) measurement. For example, parameters used for the L3 filtering and time to trigger may be transmitted to the UE 10 independently from legacy parameters. As another implementation, the UE 10 can reuse same L3 filtering ant time to trigger, which is used for legacy CRS based RRM measurement. For example, the parameters used for the L3 filtering and time to trigger may include all or part of parameters used for conventional CRS based measurement.

For example, because the different beams are affected by the different transmission characteristics, the same Quasi co-location information may not be used for the different beams. According to one or more embodiments of a first modified example of the present invention, the beam ID as the Quasi co-location information may be used. For example, the beam ID based Quasi co-location information may be informed to UE and used for time synchronization and frequency synchronization.

According to one or more embodiments of the example of the present invention, the UE 10 may perform synchronization for reception of the multiple SSs using synchronization information for a signal received before the reception of the multiple SSs.

Furthermore, for example, the multiple SSs are multiplexed in a unit of successive time (e.g., Orthogonal Frequency Division Multiplexing (OFDM) symbol or within single OFDM symbol).

Second Example

According to one or more embodiments of a second example of the present invention, the BS 20 may transmit a Non-precoded SS and the UE 10 may perform channel measurement based on the received SS and select the beam ID based on the channel measurement. Then, the BS 20 may determine a beam for the UE 10 based on the beam ID (or Precoding Matrix Indicator (PMI)) selected by the UE 10. The PMI can be determined based on legacy LTE codebooks or newly defined codebook.

Figure 5:
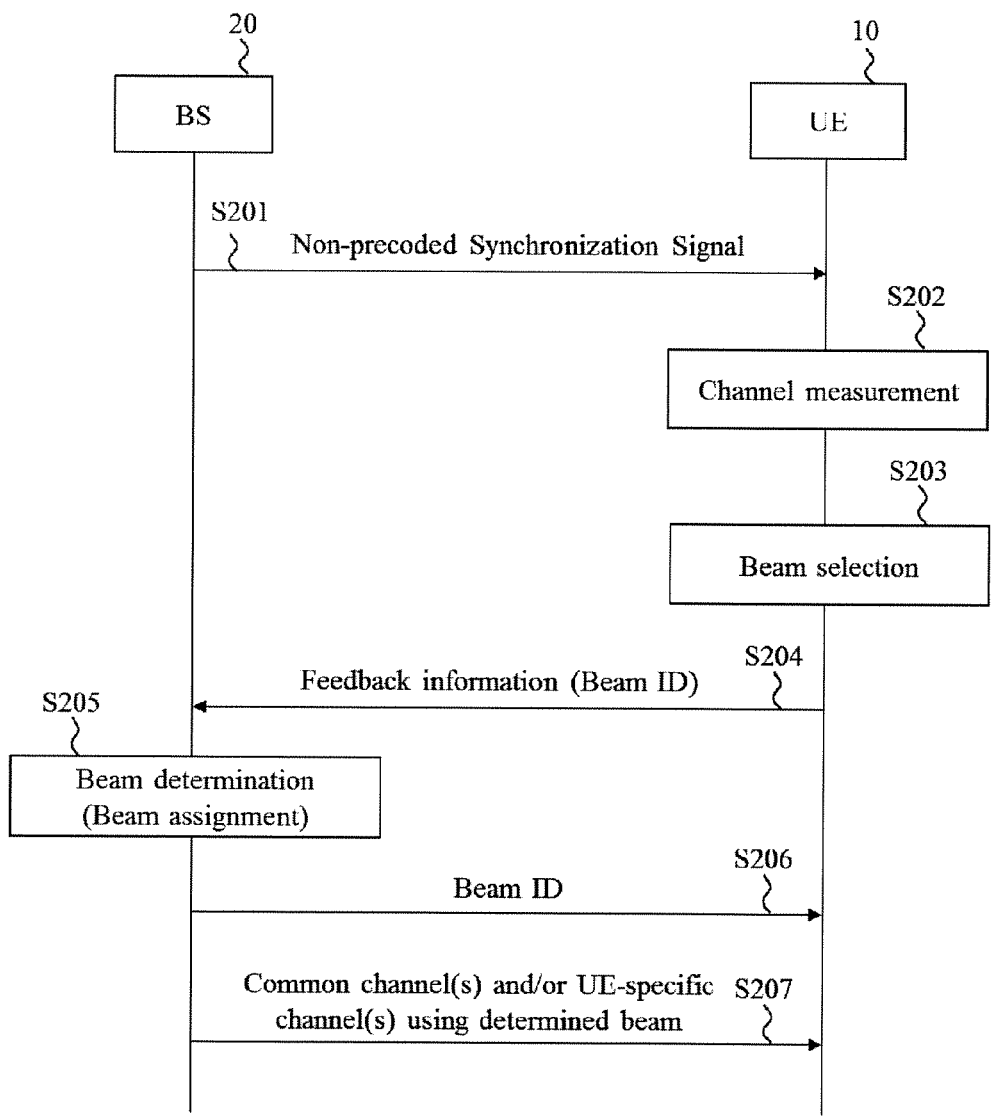
FIG. 5 is a sequence diagram showing a beam determination (selection) scheme according to one or more embodiments of a second example of the present invention.

FIG. 5 is a sequence diagram showing a beam determination (selection) scheme according to one or more embodiments of the second example of the present invention. As shown in FIG. 5, the BS 20 may transmit a Non-precoded SS within the coverage of the BS 20 (step S201). For example, like one or more embodiments of the first example, each of the BF SS includes the beam ID associated with the beam used for transmission of the BF SS. As another example, the SS may not be beamformed. As another example, the number of the SS may be at least one.

The UE 10 may receive Non-precoded SS transmitted from the BS 20. The UE 10 acknowledges the beam IDs based on the received SS. Then, the UE 10 may perform the channel measurement based on the received SS (step S202). Based on the channel measurement result of the received SS, the UE 10 may select the beam ID (step S203).

Then, the UE 10 may transmit the selected beam ID as feedback information to the BS 20 (step S204).

The BS 20 may determine the beam for transmission to the UE 10 based on the beam ID selected by the UE 10 (step S205). In other words, the BS 20 may assign the beam ID to the beam for transmission to the UE 10.

Then, the BS 20 may transmit, to the UE 10, the beam ID assigned to the beam for transmission to the UE 10 (step S206).

Then, the BS 20 may transmit, to the UE 10, common channel(s) and/or UE-specific channel(s) using the determined beam (step S207).

Thus, according to one or more embodiments of the first example of the present invention, it may be possible to ensure coverage for the radio communication system 1 using the higher frequency.

Third Example

According to one or more embodiments of a third example of the present invention, the BS 20 may transmit BF predetermined signal(s) for the beam selection and the UE 10 may determine a beam based on the predetermined signal(s). For example, the predetermined signal for beam selection may be a CRS/CSI-RS/Discovery Reference Signal (DRS) based signal or a newly defined signal such as the MRS.

Figure 6:
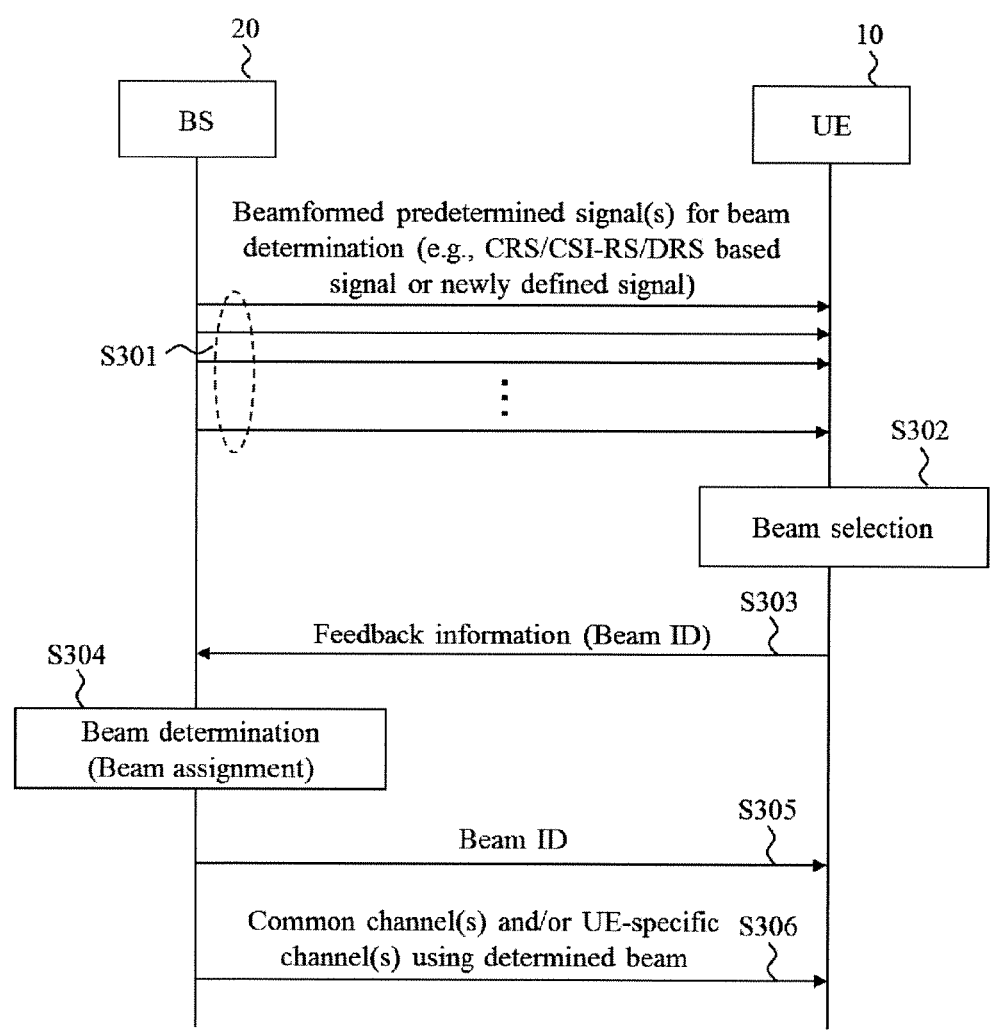
FIG. 6 is a sequence diagram showing a beam determination (selection) scheme according to one or more embodiments of a third example of the present invention.

FIG. 6 is a sequence diagram showing a beam determination (selection) scheme according to one or more embodiments of the third example of the present invention. As shown in FIG. 6, the BS 20 may transmit the BF predetermined signal(s) for beam determination within the coverage of the BS 20 (step S301). For example, the predetermined signal can be used at least for timing synchronization. It can be also used to determine a beam ID associated with the beam used for transmission from the BS 20.

The UE 10 may receive the predetermined signal(s) from the BS 20. The UE 10 may obtain beam ID(s) from the received predetermined signal(s). Then, the UE 10 may select a beam out of the obtained beam ID(s) included in the predetermined signal(s) (step S302). For example, the UE 10 may select a preferred beam for the UE 10 out of the obtained beam ID(s).

Then, the UE 10 may transmit the selected beam ID as feedback information to the BS 20 (step S303).

The BS 20 may determine the beam for transmission to the UE 10 based on the beam ID selected by the UE 10 (step S304). In other words, the BS 20 may assign the beam ID to the beam for transmission to the UE 10.

Then, the BS 20 may transmit, to the UE, the beam ID assigned to the beam for transmission to the UE 10 (step S305).

The BS 20 may transmit, to the UE 10, common channel(s) and/or UE-specific channel(s) using the determined beam (step S306).

Thus, according to one or more embodiments of the third example of the present invention, a beam gain may be applied for transmission from the BS 20 to the UE 10 after the beam determination (after the step S304 in FIG. 6). Furthermore, it is beneficial that beam determination is conducted at an initial stage of communication, e.g., random access procedure, in order to utilize the benefit of berm determination for the following communication.

According to one or more embodiments of a modified third example, like embodiments of the second example, when the predetermined signal is not beamformed, the UE 10 may perform the channel measurement based on the received predetermined signal. Then, the BS 20 may determine the beam for transmission to the UE10 based on the PMI from the UE 10.

According to one or more embodiments of a modified third example, the predetermined signals may be transmitted from a plurality of antenna ports (APs) of the BS 20. Different APs can be beamformed with different beamformer.

According to one or more embodiments of a modified third example, the predetermined signal may be multiplexed at a time and/or frequency location relative to the SS. As a result, information for detection of the beam may not be required. Therefore, it may be beneficial in a stage of the initial connection procedure in which system information (e.g., system band) is limited.

According to one or more embodiments of a modified third example, the predetermined signal may be multiplexed at a center frequency like the SS. For example, the predetermined signal may be included in or transmitted with a band of the SS or a minimum system band. For example, the predetermined signal may be multiplexed in a unit of successive time (e.g., OFDM symbol).

According to one or more embodiments of a modified third example, a plurality of different beams for transmission of the predetermined signal may be comb-multiplexed in a frequency (e.g., sub carrier). As a result, it may be possible to decrease frequency-selective fading and enables wideband channel measurement.

According to one or more embodiments of a modified third example, the BS 20 may transmit the predetermined signal based on information such as a cell ID that is obtained by the UE 10 using the decoded SS. For example, UE 10 may determine the transmission sequence and the multiplexing position of the predetermined signal.

According to one or more embodiments of a modified third example, a configuration of the predetermined signal may be the same configuration of the CSI-RS or a configuration based on the CSI-RS configuration. As a result, it may be possible to perform the beam selection based on the same process from the initial connection procedure through the CSI estimation.

According to one or more embodiments of a modified third example, the predetermined signal may be included in the DRS. As a result, it may be possible to complete both the cell discovery and the rough beam selection at the stage of the initial connection procedure.

According to one or more embodiments of a modified third example, the predetermined signal may be the cell-common signal or the UE-specific signal.

According to one or more embodiments of a modified third example, the beam selection may be performed based on an uplink received signal and channel reciprocity. For example, a Physical Random Access Channel (PRACH), the SRS, and the DMRS may be used as the uplink received signal.

Fourth Example

Figure 7:
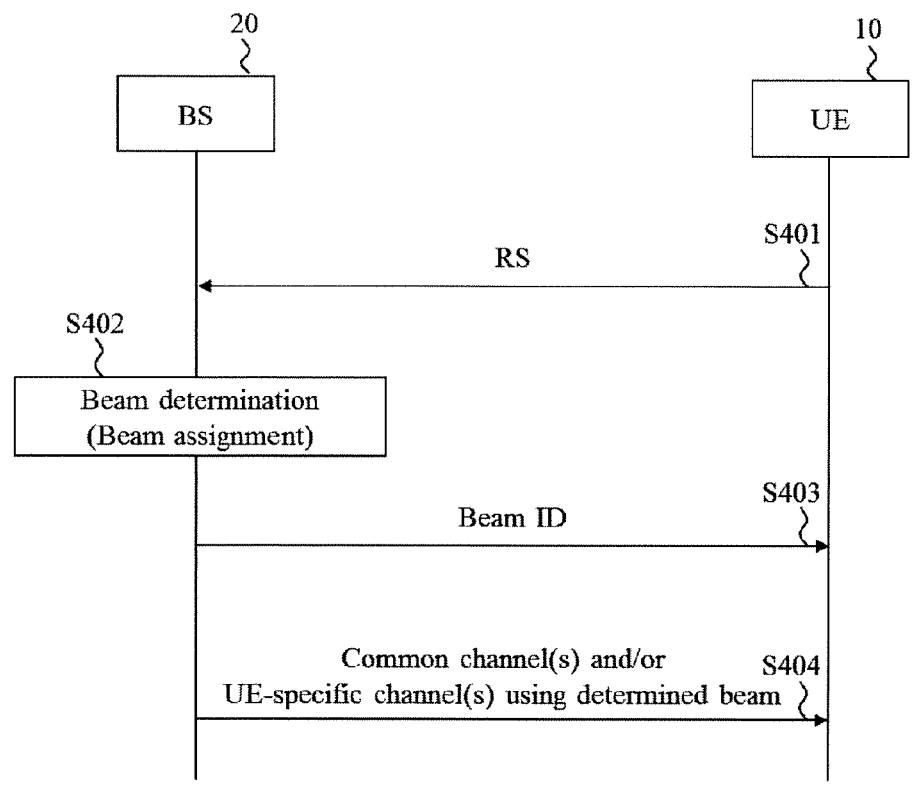
FIG. 7 is a sequence diagram showing a beam determination (selection) scheme according to one or more embodiments of the fourth example of the present invention.

FIG. 7 is a sequence diagram showing a beam determination (selection) scheme according to one or more embodiments of the fourth example of the present invention. As shown in FIG. 7, the UE 10 may transmit an uplink reference signal (RS) to the BS 20 (step S401).

The BS 20 may determine the beam for transmission to the UE 10 based on the uplink RS from the UE 10 (step S402). In other words, the BS 20 may assign the beam ID to the beam for transmission to the UE 10.

Then, the BS 20 may transmit, to the UE 10, the beam ID assigned to the beam for transmission to the UE 10 (step S403).

The BS 20 may transmit, to the UE 10, UE-specific channels such as data signals via a Physical Downlink Shared Channel (PDSCH) using the determined beam (step S404).

Thus, according to one or more embodiments of the fourth example of the present invention, it may be possible to ensure coverage for the radio communication system 1 using the higher frequency.

(Feedback Information)

Figure 8:
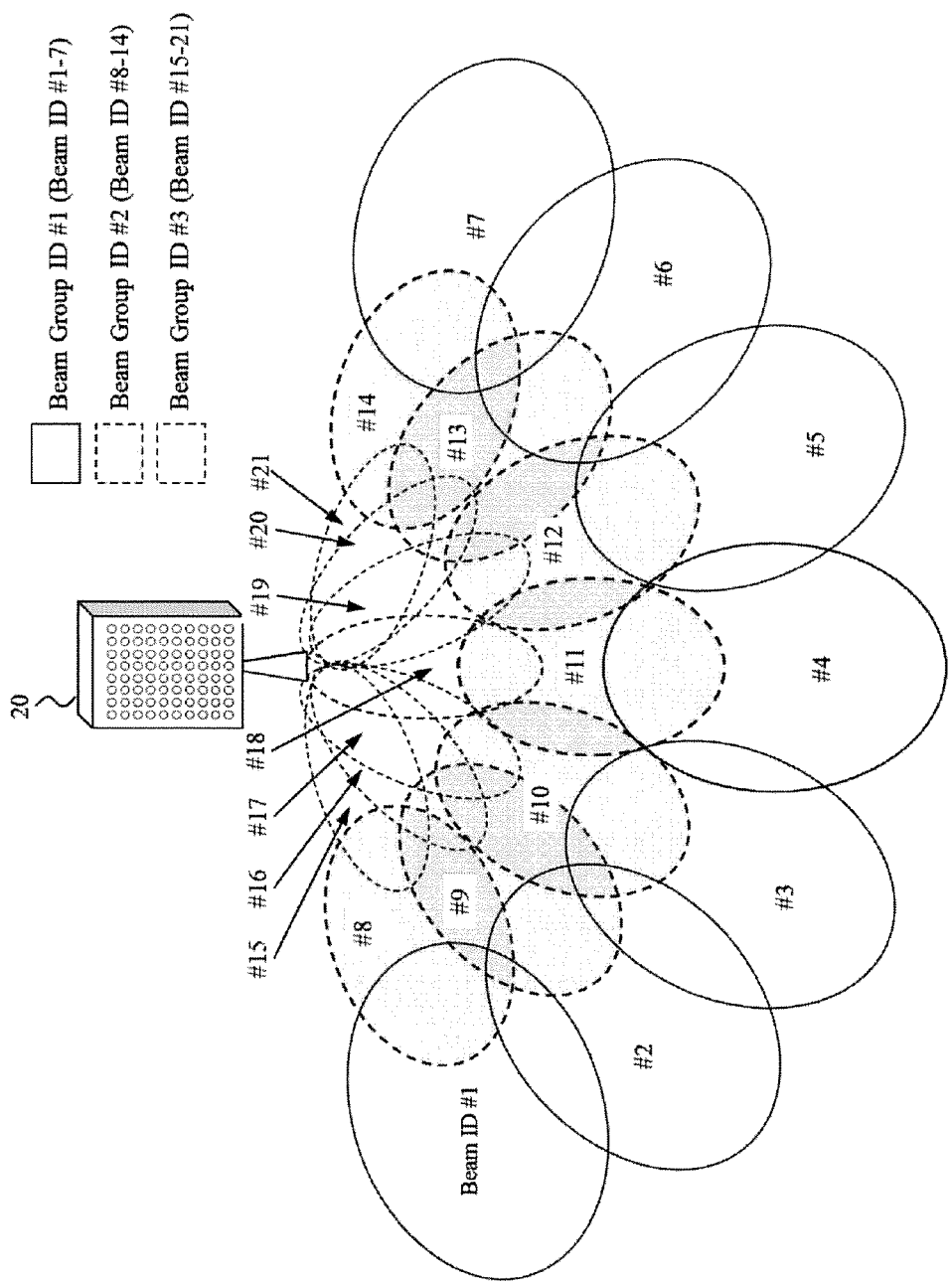
FIG. 8 is a diagram showing a configuration of beam group IDs and beam IDs according to one or more embodiments of a fifth example of the present invention.

Configurations of feedback information according to one or more embodiments of the present invention will be described below with reference to FIG. 8, Fifth Example According to one or more embodiments of a fifth example of the present invention, the feedback information transmitted from the UE 10 may be a beam group ID that includes beam ID. As shown in FIG. 8, for example, the beam IDs #1-#21 may be grouped into three beam group IDs and each group ID includes seven beam IDs. The number of the beam group IDs and the number of the beam IDs included in each group ID may be any number. For example, the BS 20 may transmit association information between the beam group IDs and the beam IDs to the UE 10 using a higher layer signaling (e.g., RRC signaling).

Figure 9:
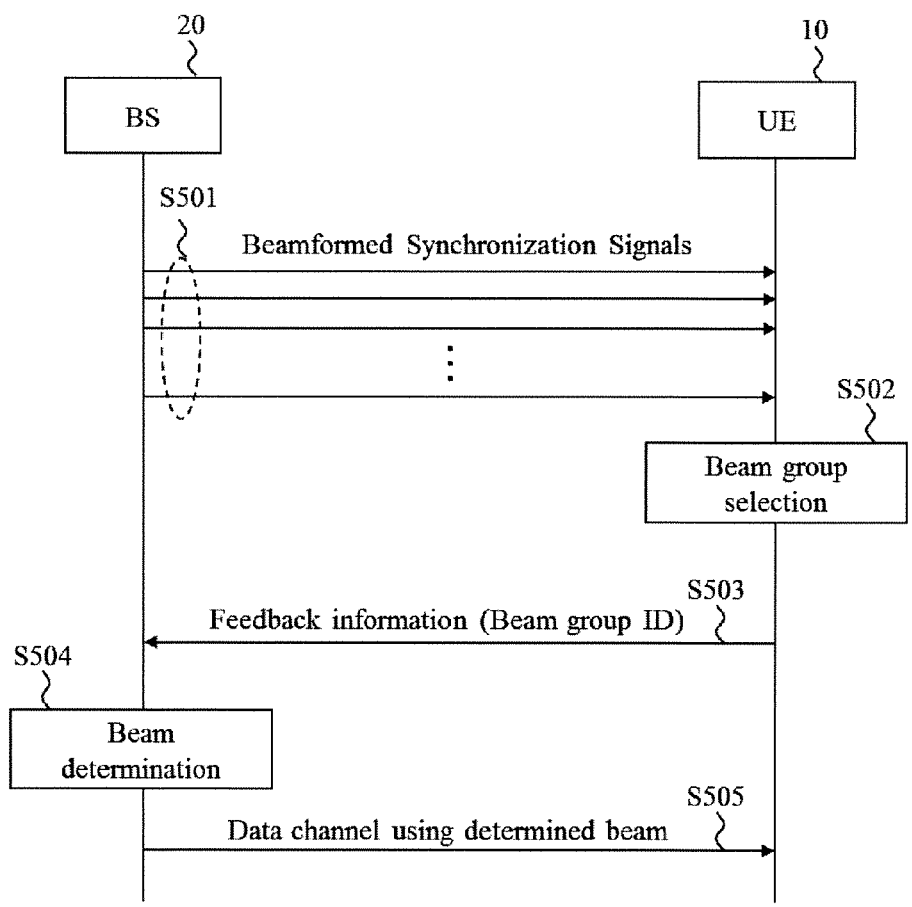
FIG. 9 is a sequence diagram showing a beam determination (selection) scheme according to one or more embodiments of the fifth example of the present invention.

FIG. 9 is a sequence diagram showing a beam determination (selection) scheme according to one or more embodiments of the fifth example of the present invention. A step S501 in FIG. 9 is the same as the step S101 in FIG. 4.

As shown in FIG. 9, the UE 10 may select the beam group ID based on the reception quality of the BF SSs (step S502). In FIG. 8, for example, when the reception quality of the beam ID #3 is the highest of all beam IDs, the UE 10 may select the beam group ID #1 including the beam ID #3 that is the highest reception quality.

Then, the UE 10 may transmit the selected beam group ID as feedback information to the BS 20 (step S503).

The BS 20 may determine the beam (beam ID) for transmission to the UE 10 based on the group ID selected by the UE 10 (step S504). In FIG. 8, for example, when the BS 20 receives the beam group ID #1 including the beam IDs

1-#7, the BS 20 may select one of the beam IDs #1-#7 included in the beam group ID #1.

Then, the BS 20 may transmit, to the UE 10, data signals via the PDSCH using the determined beam (step S505).

According to one or more embodiments of the fifth example of the present invention, it may be possible to reduce overhead of the feedback information compared with transmission of feedback information including a plurality of beam IDs.

According to one or more embodiments of another example of the present invention, the feedback information may be indicated as at least one of a beam index (BI) format and a PMI format. The BI may be referred to as Channel State Information Reference Signal Resource Index (CRI).

According to one or more embodiments of another example of the present invention, the UE 10 may transmit at least a beam ID associated with the beam of which the reception quality is the highest (or lowest) of a plurality of beams from the BS 20 as the feedback information.

Although the present disclosure described an examples of explicitly transmitting the beam ID as the feedback information, the present invention is not limited thereto. One or more embodiments of the present invention may also apply to implicitly transmitting the beam ID as the feedback information. For example, the UE 10 may notify the BS 20 of the feedback information including the beam ID based on time/frequency-multiplexing positions, for example, relative to transmission/reception resources of the cell-common signals. For example, the UE 10 may notify the BS 20 of the feedback information including the beam ID based on transmission timing of the uplink signal. For example, the UE 10 may notify the BS 20 of the feedback information including the beam ID after a predetermined period from when the UE 10 receive the best beam.

According to one or more embodiments of another example of the present invention, the UE 10 may transmit upper (or lower) "n" beam IDs associated with the beams of which the reception quality is the highest (or lowest) of a plurality of beams from the BS 20 as the feedback information.

According to one or more embodiments of another example of the present invention, configurations of the feedback information described above may be combined. For example, the UE 10 may transmit the beam ID of which the reception quality is the highest and the lower "n" beam IDs of which the reception quality is the lowest as the feedback information. For example, the UE 10 may transmit a plurality of preferred beam IDs and the beam group ID including the lower "n" beam IDs of which the reception quality is lowest.

According to one or more embodiments of another example of the present invention, the UE 10 may transmit beam selection information using the PMI as the feedback information.

According to one or more embodiments of another example of the present invention, the UE 10 may transmit the feedback information including the reception quality such as RSSI, Channel Quality Information (CQI), or the RSRP for each beam.

According to one or more embodiments of another example of the present invention, the UE 10 may not transmit the feedback information. In such case, for example, the UE 10 may multiply the cell-common signals such as SSs by different precoders to ensure the coverage.

(Feedback Information Multiplexing Method)

The feedback information according to one or more embodiments of the present invention may be multiplexed with a Physical Uplink Shared Channel (PUSCH) or a Physical Uplink Control Channel (PUCCH) as CSI.

According to one or more embodiments of another example of the present invention, the feedback information may be reported to the BS 20 as a RRM measurement result.

According to one or more embodiments of another example of the present invention, the feedback information may be multiplexed with the PRACH or may be transmitted to the BS 20 during a Random Access Channel (RACH) procedure. As a result, the coverage for the RACH procedure may be ensured.

According to one or more embodiments of another example of the present invention, the UE 10 may transmit the feedback information using a cell search and handover mechanism defined in the LTE standard. For example, the UE may transmit the feedback information periodically, aperiodically, or in accordance with an event-based manner.

Other Examples

According to one or more embodiments of the present invention, the beam selection (determination) in the step S102 in FIG. 4, the step 204 in FIG. 5, the step S302 in FIG. 6, and the step S504 in FIG. 9 may be performed during the initial connection procedure (e.g., RACH procedure), after the initial connection procedure, e.g., CSI acquisition, or both of during and after the initial connection procedure. The beam selection (determination) may be beneficial to secure following fluctuation of a transmission path characteristic roughly and continuous connections. It can be also reported aperiodic ally.

According to one or more embodiments of the present invention, the selected (determined) may be applied for not only the cell-common signals but also a UE-specific signal such as a data signal.

According to one or more embodiments of the present invention, the BS 20 may notify the UE 10 of the number of the beams selected by the UE 10 in the beam selection using the SS. For example, the number of the beams selected by the UE 10 included in the SS may be indicated as discrete value (e.g., "00: No beam selection", "01: 8 beams", "10: 16 beams", "11: 32 beams").

According to one or more embodiments of the present invention, the number of the antenna ports (APs) of the BS 20 per beam maybe 1-Tx antenna or 2-Tx antenna (in view of a polarized wave) for determining rough beam directions. For example, the BS 20 may transmit the SSs or the predetermined signals using 1-Tx antenna of 2-Tx antenna. For example, each of the beams may be multiplexed using each of APs (e.g., AP1: Beam #1, AP2: Beam #2 . . . ).

According to one or more embodiments of the present invention, Measurement Restriction(s) (MR(s)) under LTE Release 13 may be applied for the SSs and the predetermined signals. For example, MR(s) may be implicitly determined. For example, the beam selection may be performed based on a reception result of a single subframe. For example, averaging a plurality of subframes may be allowed and whether the averaging a plurality of subframes is allowed may be switched. For example, MR(s) information may be multiplexed with the SS. The MR(s) is not limited to the MR(s) under LTE Release 13, but may be a new mechanism such as a dynamic notification of whether the averaging a plurality of subframes is allowed or not.

According to one or more embodiments of another example of the present invention, certain features described above may be applied for the CSI-RS, the CRS, and other downlink signals.

According to one or more embodiments of another example of the present invention, the UE 10 may transmit the CSI feedback for the selected beam in the beam selection. For example, the BS 20 may designate, to the UE 10, the beam of a CSI feedback target. For example, the BI of the beam of the CSI feedback target may be configured with a higher layer or a lower layer. For example, the BI may be used as initial information of the CSI. For example, the beam direction of the BF CSI-RS may be determined based on the BI.

According to one or more embodiments of another example of the present invention, co-location information may be designated based on a virtual cell. For example, the same co-location information may be applied for the cell-common signals within the virtual cell.

Under the LTE standard, the SS is transmitted using six resource blocks. However, the bandwidth for the SS transmission may not be sufficient for the beam selection. According to one or more embodiments of another example of the present invention, the system bandwidth information may be notified using the SS and the predetermined signals for the beam determination may be transmitted to a wide band based on the system bandwidth information.

For example, when a plurality of beams is selected in the beam selection, interference between the beams may become larger. According to one or more embodiments of another example of the present invention, the initial beam selection may be limited so as to select a single beam.

According to one or more embodiments of another example of the present invention, transmit diversity may be applied for all or part of the cell-common signals. The transmit diversity scheme may be a Cyclic Delay Diversity (CDD), a Space-Time Block Code (STBC), or Space-Frequency Block Code (SFBC) based transmission diversity scheme or other schemes.

According to one or more embodiments of another example of the present invention, to ensure the coverage, the cell-common signals may be repeatedly transmitted so that the cell-common signals are time/frequency-multiplexed or code multiplexed.

(Configuration of Base Station)

Figure 10:
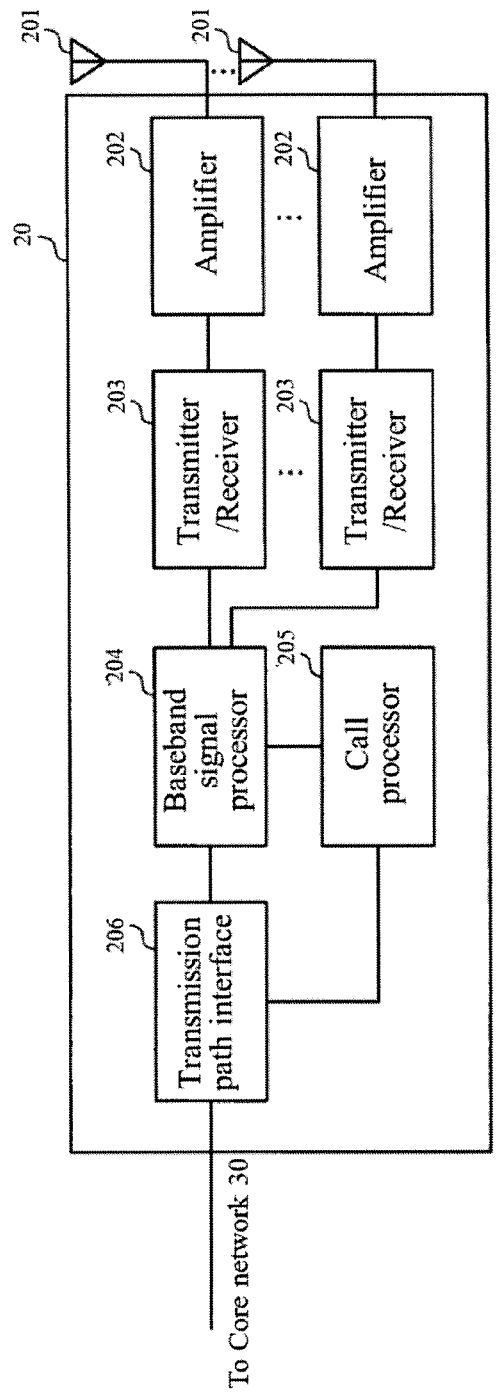
FIG. 10 is a block diagram showing a schematic configuration of the base station according to one or more embodiments of the present invention.

The BS 20 according to one or more embodiments of the present invention will be described below with reference to FIG. 10 a block diagram illustrating schematic configuration of the BS 20 according to one or more embodiments of the present invention. The BS 20 may include a plurality of antennas 201, amplifier 202, transceiver (transmitter/receiver) 203, a baseband signal processor 204, a call processor 205 and a transmission path interface 206.

User data that is transmitted on the DL from the BS 20 to the UE 20 is input from the core network 30, through the transmission path interface 206, into the baseband signal processor 204.

In the baseband signal processor 204, signals are subjected to Packet Data Convergence Protocol (PDCP) layer processing, Radio Link Control (RLC) layer transmission processing such as division and coupling of user data and RLC retransmission control transmission processing, Medium Access Control (MAC) retransmission control, including, for example, HARQ transmission processing, scheduling, transport format selection, channel coding, inverse fast Fourier transform (IFFT) processing, and precoding processing. Then, the resultant signals are transferred to each transceiver 203. As for signals of the DL control channel, transmission processing is performed, including channel coding and inverse fast Fourier transform, and the resultant signals are transmitted to each transceiver 203.

The baseband signal processor 204 notifies each UE 10 of control information for communication in the cell by a broadcast channel. Information for communication in the cell includes, for example, UL or DL system bandwidth.

In each transceiver 203, baseband signals that are precoded per antenna and output from the baseband signal processor 204 are subjected to frequency conversion processing into a radio frequency band. The amplifier 202 amplifies the radio frequency signals having been subjected to frequency conversion, and the resultant signals are transmitted from the antennas 201.

As for data to be transmitted on the UL from the UE 10 to the BS 20, radio frequency signals are received in each antennas 201, amplified in the amplifier 202, subjected to frequency conversion and converted into baseband signals in the transceiver 203, and are input to the baseband signal processor 204.

The baseband signal processor 204 performs FFT processing, IDFT processing, error correction decoding, MAC retransmission control reception processing, and RLC layer and PDCP layer reception processing on the user data included in the received baseband signals. Then, the resultant signals are transferred to the core network 30 through the transmission path interface 206. The call processor 205 performs call processing such as setting up and releasing a communication channel, manages the state of the BS 20, and manages the radio resources.

Figure 11:
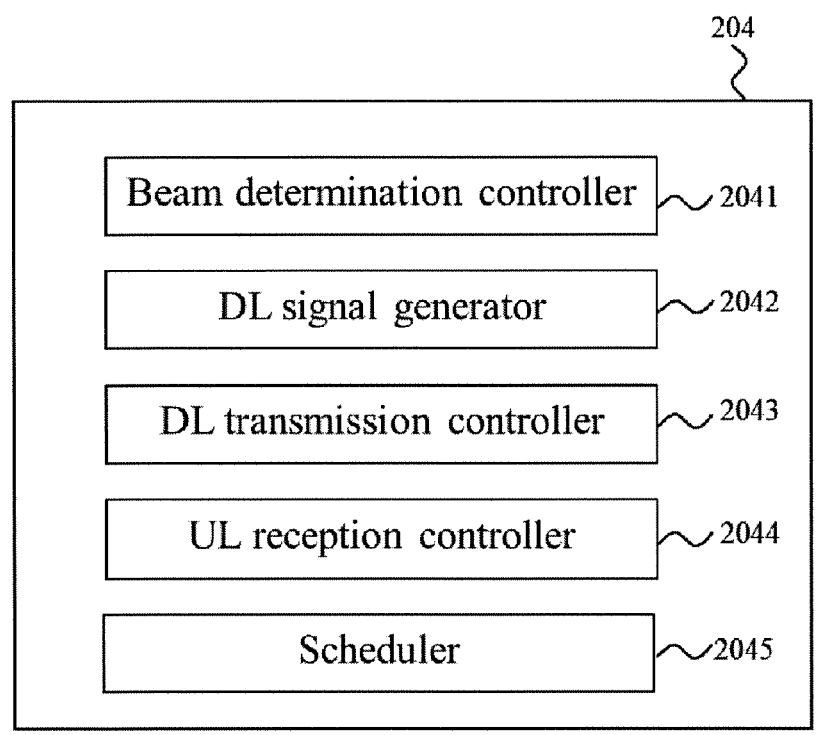
FIG. 11 is a block diagram showing a detailed configuration of the base station according to one or more embodiments of the present invention.

FIG. 11 is a block diagram illustrating a detailed configuration of the BS 20 according to one or more embodiments of the present invention. As shown in FIG. 11, the baseband signal processor 204 of the BS 20 may include a beam determination controller 2041, a DL signal generator 2042, a DL transmission controller 2043, an UL reception controller 2044, and a scheduler 2045.

The beam determination controller 2041 may determine the beam for transmission to the UE based on the beam ID(s) and the PMI(s). The scheduler 2045 may control the scheduling of the DL data signal (PDSCH), control information (PDCCH/EPDCC), and DL reference signals. The DL signal generator 2042 may generate the DL signals such as the DL data signal, the DL control information, and DL reference signals. The DL transmission controller 2043 may transmit the DL signals. The UL reception controller 2044 may perform the reception processing for the UL signals transmitted by the UE 10.

(Configuration of User Equipment)

Figure 12:
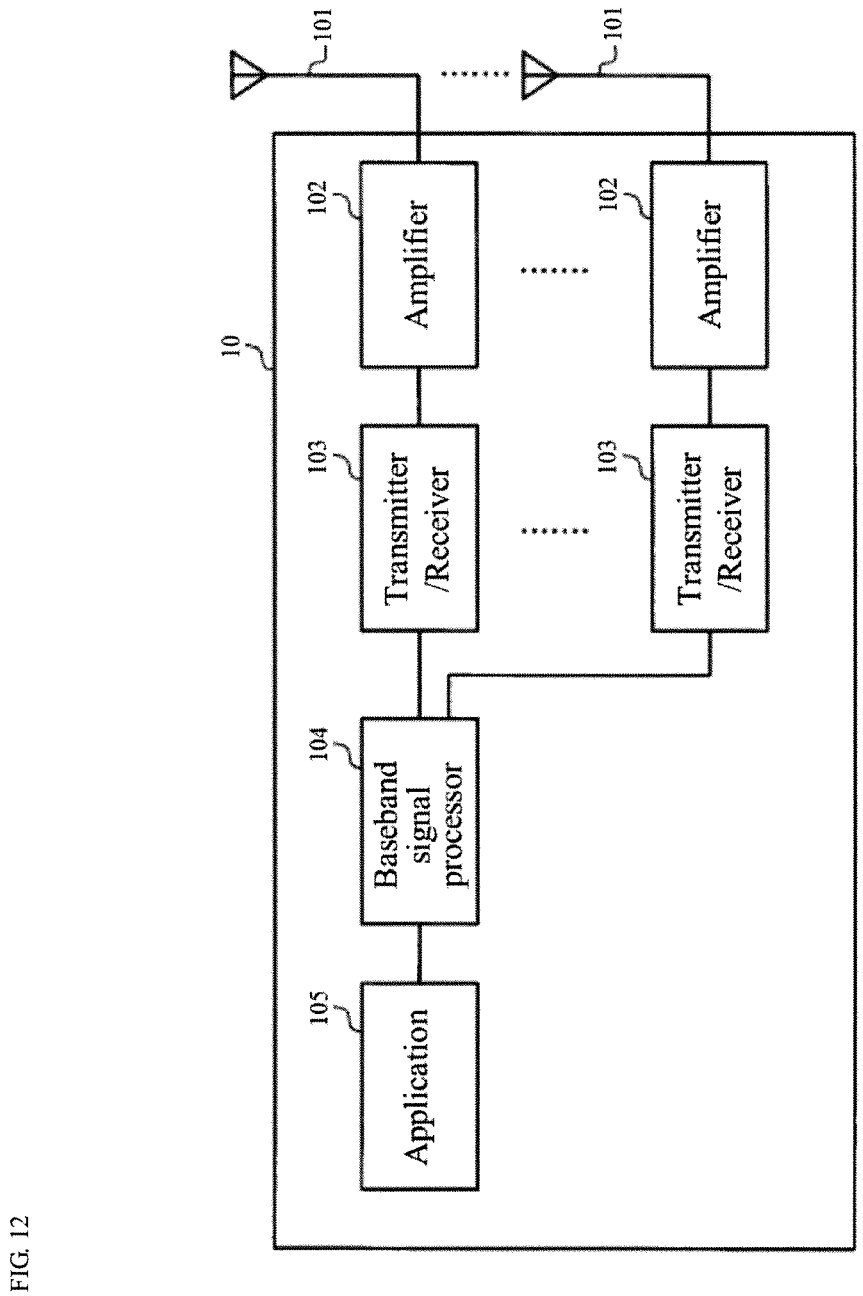
FIG. 12 is a block diagram showing a schematic configuration of the user equipment according to one or more embodiments of the present invention.

The UE 10 according to one or more embodiments of the present invention will be described below with reference to FIG. 12, a diagram illustrating an overall configuration of the UE 10. The UE 10 has a plurality of UE antennas 101, amplifiers 102, transceiver (transmitter/receiver) 103, a baseband signal processor 104, and an application 105.

As for DL, radio frequency signals received in the UE antennas 101 are amplified in the respective amplifiers 102, and subjected to frequency conversion into baseband signals in the transmission/reception sections 103. These baseband signals are subjected to reception processing such as FFT processing, error correction decoding and retransmission control and so on, in the baseband signal processor 104. The DL user data is transferred to the application 105. The application 105 performs processing related to higher layers above the physical layer and the MAC layer. In the downlink data, broadcast information is also transferred to the application 105.

On the other hand, UL user data is input from the application 105 to the baseband signal processor 104. In the baseband signal processor 104, retransmission control (Hybrid ARQ) transmission processing, channel coding, precoding, DFT processing, IFFT processing and so on are performed, and the resultant signals are transferred to each transceiver 103. In the transceiver 103, the baseband signals output from the baseband signal processor 104 are converted into a radio frequency band. After that, the frequency-converted radio frequency signals are amplified in the amplifier 102, and then, transmitted from the transmission/reception antenna 101.

Figure 13:
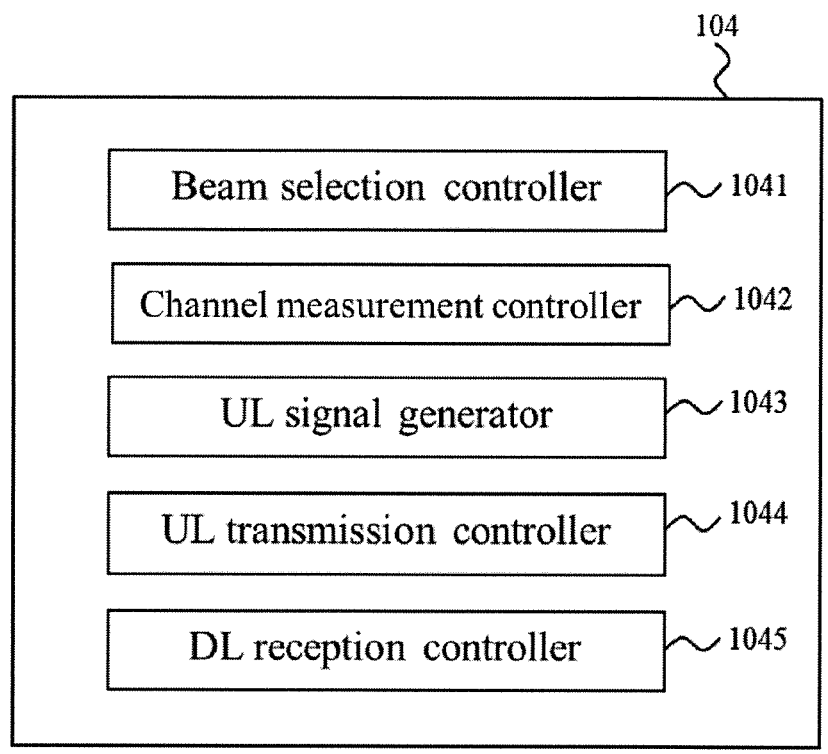
FIG. 13 is a block diagram showing a detailed configuration of the user equipment according to one or more embodiments of the present invention.

FIG. 13 is a block diagram illustrating a detailed configuration of the UE 10 according to one or more embodiments of the present invention. As shown in FIG. 13, the baseband signal processor 104 of the UE 10 may include a beam selection controller 1041, a channel measurement controller 1042, an UL signal generator 1043, a UL transmission controller 1044, and a DL reception controller 1045.

The beam selection controller 1041 may select the beam out of a plurality of beams used for transmission of the plurality of BF SSs or predetermined signals based on the reception quality of the BF SSs or predetermined signals. The channel measurement controller 1042 may perform channel measurement based on the received SSs or predetermined signals. The UL signal generator 1043 may generate the feedback information including the beam ID(s) and the PMI(s). The UL transmission controller 1044 may transmit the UL signals. The DL reception controller 1045 may perform the reception processing for the DL signals transmitted by the BS 20.

Although the present disclosure mainly described examples of downlink transmission, the present invention is not limited thereto. One or more embodiments of the present invention may also apply to uplink transmission.

Although the present disclosure mainly described examples of a channel and signaling scheme based on LTE/LTE-A, the present invention is not limited thereto. One or more embodiments of the present invention may apply to another channel and signaling scheme having the same functions as LTE/LTE-A and a newly defined channel and signaling scheme.

The above examples and modified examples may be combined with each other, and various features of these examples can be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATION OF REFERENCES

1 Radio communication system
10 User equipment (UE)
101 UE antennas
102 Amplifiers
103 Transceiver
104 Baseband signal processor
105 Application
1041 Beam selection controller
1042 Channel measurement controller
1043 UL signal generator
1044 UL transmission controller
1045 DL reception controller
20 Base station (BS)
21 Antenna
201 Antennas
202 Amplifier
203 Transceiver
204 Baseband signal processor
2041 Beam determination controller
2042 DL signal generator
2043 DL transmission controller
2044 UL reception controller
2045 Scheduler
205 Call processor
206 Transmission path interface

What is claimed is:

1. A method for radio communication, the method comprising:
    transmitting, with a base station (BS), multiple first signals using respectively different radio resources;
    receiving, with a user equipment (UE), the multiple first signals;
    notifying, with the BS, the UE of information indicating a number of at least one first radio resource to be selected;
    selecting, with the UE, the at least one first radio resource from the different radio resources based on Reference Signal Received Power (RSRP) of the multiple first signals and the notified information; and
    determining, with the UE, a signal sequence of a Cell-specific signal based on the at least one first radio resource,
    wherein the Cell-specific signal is different from the multiple first signals,
    wherein the multiple first signals comprise a common signal sequence, and
    wherein the Cell-specific signal is a downlink Demodulation Reference Signal (DMRS).

2. The method according to claim 1, wherein the multiple first signals comprise Synchronization Signals (SSs).

3. The method according to claim 1, wherein the at least one first resource is selected by the UE during an initial connection procedure between the UE and the BS.

4. A user equipment (UE) comprising:
    a receiver that receives, from a base station (BS):
        multiple first signals transmitted using respectively different radio resources; and
        information indicating a number of at least one first radio resource to be selected; and
    a processor that selects the at least one first radio resource from the different radio resources based on Reference Signal Received Power (RSRP) of the multiple first signals and the received information, wherein
        the processor determines a signal sequence of a Cell-specific signal based on the at least one first radio resource,
        the Cell-specific signal is different from the multiple first signals,
        the multiple first signals comprise a common signal sequence, and
        the Cell-specific signal is a downlink Demodulation Reference Signal (DMRS).

5. The UE according to claim 4, wherein the multiple first signals comprise Synchronization Signals (SSs).

6. The UE according to claim 4, wherein the processor selects the at least one first radio resource during an initial connection procedure between the UE and the BS.

7. A base station (BS) comprising:
a transmitter that transmits, to a user equipment (UE):
multiple first signals transmitted using respectively different radio resources; and
information indicating a number of at least one first radio resource to be selected by the UE,
wherein the multiple first signals comprise a common signal sequence,
the at least one first radio resource is selected from the different radio resources based on Reference Signal Received Power (RSRP) of the multiple first signals and the transmitted information,
a signal sequence of a Cell-specific signal is determined based on the at least one first radio resource,
the Cell-specific signal is different from the multiple first signals, and
the Cell-specific signal is a downlink Demodulation Reference Signal (DMRS).

8. The BS according to claim 7, wherein the multiple first signals comprise Synchronization Signals (SSs).

9. The BS according to claim 7, wherein the at least one first radio resource is selected by the UE during an initial connection procedure between the UE and the BS.

* * * * *